Patented July 8, 1941

2,248,518

UNITED STATES PATENT OFFICE 2,248,518

MANUFACTURE OF ETHERS OF PHENYLMETHYLCARBINOL AND ITS HOMOLOGUES

Herbert Muggleton Stanley, Tadworth, Gregoire Minkoff, Epsom Downs, and James Ernest Youell, Wallington, England, assignors to The Distillers Company Limited, Edinburgh, Scotland, a British company No Drawing. Application July 19, 1939, Serial No. 285,438. In Great Britain August 10, 1938

6 Claims. (Cl. 260—611)

This invention relates to the manufacture of ethers of phenylmethylcarbinol and its homologues and to the decomposition thereof.

According to the present invention ethers of phenylmethylcarbinol and its homologues are obtained by condensation of aryl substituted mono-olefines such as styrene, α-methyl styrene, and para-isopropyl styrene and the like with the requisite alcohol and then separating the ether body. Such ethers can be produced not only from substantially pure aryl substituted mono-olefines but also from these substances in an impure or adulterated state and a particularly valuable use of the ethers produced is to recover from them, by decomposition, the aryl substituted mono-olefines, e. g. monomeric styrene in a pure state.

Monomeric styrene can be produced technically by the thermal decomposition of hydrocarbons such as ethylbenzene and isopropylbenzene but it is obtained in the form of a solution in the excess of those hydrocarbons and owing to the closeness in the boiling points of the styrene and the hydrocarbons it is extremely difficult to separate the monostyrene with a high degree of purity such as is required in the electrical industry, i. e. monostyrene of 99% purity or of an even higher degree of purity.

Pure monomeric styrene can be produced according to the present invention from impure or adulterated styrene, such as styrene in solution in excess of the starting hydrocarbon from which it has been produced by pyrolysis, by converting it into an ether of phenylmethylcarbinol by condensation with the corresponding alcohol as above stated and by then separating the ether body and decomposing it to yield a mixture of the desired pure monomeric styrene and the alcohol, and finally separating these two bodies from one another.

The conversion of the impure or adulterated styrene, such as styrene in solution in inert solvents from which it is difficult to separate the styrene, (e. g. the product of partial pyrolysis of ethylbenzene or isopropyl benzene) into an ether of phenylmethylcarbinol can be effected with high yield by treating it with the requisite alcohol in anhydrous form in the presence of a suitable catalyst, the conversion being represented by the equation

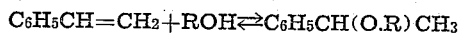

The ether produced, being of relatively high boiling point, is then separated from unchanged alcohol, unchanged monomeric styrene, and inert hydrocarbon solvent, by fractional distillation (preferably under reduced pressure).

Suitable anhydrous alcohols for the ether formation are ethanol, methanol and n-butanol, particularly the last two, although other alcohols the boiling points of which are so far removed from that of the monomeric styrene as to make the separation by simple distillation feasible can be employed. Suitable catalysts for the ether formation are concentrated acids such as sulphuric acid, perchloric acid, or chloracetic acid, but we prefer sulphuric acid at a temperature of between 50° and 150° C. In order to prevent thermal polymerisation of the styrene during the ether formation we add a small amount of a polymerisation inhibitor, for example pyrogallol, to the reaction mixture.

When the ether formation is completed, the acid catalyst is removed, as by washing with water or alkali, and the mixture is then distilled to yield the pure ether of phenylmethylcarbinol. It is important to carry out this distillation in the absence of acidic materials as they may lead to the decomposition of the ether.

The combination of styrene with alcohols to form ethers of phenylmethylcarbinol is an equilibrium process, the production of ethers being favoured by the presence of an excess of alcohol and the use of the lowest temperatures consistent with reasonable reaction velocity. In practice it is necessary, in the case of styrene, to operate at temperatures of 80° C. or over in the presence of sulphuric acid as catalyst. At higher temperatures, say up to 150° C., the reaction velocity is high and the amount of catalyst necessary is small but if these temperatures are exceeded there is an excessive tendency to form dialkyl ethers from the alcohol used. When operating at temperatures in the neighbourhood of 100–140° C. with small amounts of sulphuric acid as catalyst, the proportion of dialkyl ether formed is not very great, and moreover, this ether may be introduced into subsequent batches to suppress the further formation of the dialkyl ethers. Since certain amounts of water are formed in the reaction both in the production of dialkyl ether and as a result of the reaction of the sulphuric acid catalyst with the free alcohol present, it is not necessary to employ absolutely anhydrous alcohols in this process but it is desirable to limit the water content as much as possible by employing substantially anhydrous alcohols and by operating under conditions whereby the production of di-alkyl ethers takes place to only a minor degree. The proportion of catalyst used should not exceed certain limits, i. e. 5% by weight of the reactants, otherwise large proportions of styrene polymers are formed.

In the case of the condensation of α-methylstyrene with alcohols, lower temperatures may be used than is possible in the case of styrene. With the former hydrocarbon, reaction may be effected at room temperature or at temperatures of about 50° C. for periods of one day or more. When the reaction between the styrene hydrocarbon and the alcohol has come to an equilibrium, the catalyst is removed, either by washing out with water and/or aqueous alkali or, preferably, by neutralisation with an organic base, such as triethanolamine. The resulting mixture is distilled to yield unchanged alcohol and styrene (as well as any other hydrocarbon diluents) and the pure ether of phenylmethylcarbinol (or its homologues). It is important to carry out the distillation in the absence of acidic materials, the presence of which may lead to the decomposition of the ether.

The following examples are given to illustrate the manner in which the invention is carried into effect.

Example 1

15 kg. of a hydrocarbon mixture of 50% by weight styrene and 50% by weight isopropylbenzene were mixed in a lead-lined pressure vessel with 15 kg. of methanol containing 0.5% by weight of 96% sulphuric acid and 0.01% by weight pyrogallol and the whole charge heated at about 135° C. for 6 hours, the pressure developed rising to about 160 lbs./sq. in. The reaction mixture was then cooled, 400 gm. of triethanolamine added and the product fractionated, first, at atmospheric pressure, and subsequently under reduced pressure. After removing a certain amount of dimethyl ether, pure methanol was obtained (about 15 litres were recovered) and then a certain amount of water. On reducing the pressure of distillation, isopropylbenzene and unchanged styrene were obtained and then 6.5 kg. of practically pure methyl ether of phenylmethylcarbinol boiling at 90° C. under 60 mm. The yield of ether calculated on the styrene originally present was thus 63% but a portion of the styrene was recovered unchanged so that the efficiency of styrene conversion was about 90%, the balance representing the production of polymers of styrene.

Example 2

15 kg. of a hydrocarbon mixture of 50% by weight styrene and 50% by weight isopropylbenzene were mixed in a lead-lined pressure vessel with 15 kg. of absolute ethanol containing 0.5% by weight of 96% sulphuric acid and a little pyrogallol and the mixture was heated at 140–150° C. under pressures developing up to 150 lbs./sq. in. for 7 hours. The product was cooled, 800 g. of triethanolamine added and the resulting mixture distilled under appropriate pressure conditions to yield some diethyl ether, 12 kg. of ethanol containing some water, a hydrocarbon mixture of isopropylbenzene and unchanged styrene and 6.4 kg. of the ethyl ether of phenylmethylcarbinol. The latter is a pungent liquid boiling at 60° C. under 8 mm. and 82° C. at 20–21 mm.

Example 3

10 kg. of a hydrocarbon mixture containing 49.5% by weight styrene and the remainder isopropylbenzene were heated under reflux with 10 kg. of n-butanol containing 2.5% by weight of concentrated sulphuric acid and a small amount of pyrogallol. The reaction temperature was about 116° C. and heating was prolonged for 10 hours, in which time about 75% of the styrene originally present had undergone reaction. The product was treated with a sufficient amount of a high-boiling base (e. g. triethanolamine) to destroy acidity and was then distilled under reduced pressure to yield a fraction containing n-butanol, isopropylbenzene and unchanged styrene (subsequently refractionated at atmospheric pressure to recover n-butanol) and 5.95 kg. of the n-butyl ether of phenylmethylcarbinol, representing a yield of over 90% on the styrene consumed. This ether is a colourless pungent liquid boiling at 86° C./8 mm. and 91° C./10 mm.

Example 4

By heating equal weights of the styrene-isopropylbenzene mixture referred to in Example 1 and n-butanol, containing 1% by weight sulphuric acid and a little pyrogallol, at 140° C. under pressure for 6 hours, about 60% of the styrene present underwent conversion and the n-butyl ether of phenylmethylcarbinol was obtained in a yield of about 80% calculated on the styrene converted.

Example 5

By heating equal parts by weight of the hydrocarbon mixture referred to in Example 1 and anhydrous isopropanol, containing 2% by weight of sulphuric acid and a little pyrogallol, at 140° C. under pressure for 6 hours, 50% of the styrene present underwent reaction. Of the styrene consumed 23% was polymerized to oily polymers and 77% was converted into the isopropyl ether of phenylmethylcarbinol, a pleasant smelling, colourless liquid boiling at 65/68° C./10 mm.

Example 6

Equal parts by weight of pure α-methylstyrene and n-butanol (the latter containing 2.5% by weight of sulphuric acid and 0.1% by weight of pyrogallol) were mixed and heated at 90° C. for 6½ hours, whereby approximately 50% of the α-methylstyrene underwent reaction. On working up the product, the n-butyl ether of phenyldimethylcarbinol was obtained in a yield of 75% based on the α-methylstyrene consumed. This substance is a pungent, colourless liquid boiling at 103° C./8 mm. or 107° C./10 mm. Higher yields and better efficiencies may be obtained by carrying out this reaction at room temperature for a period of several days or by operating at about 50° C. for 1 day.

The decomposition of the pure ethers of phenylmethylcarbinol is represented by the following equation:

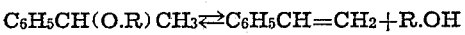
$$C_6H_5CH(O.R)CH_3 \rightleftarrows C_6H_5CH=CH_2 + R.OH$$

This decomposition may be effected by carefully distilling with the aid of a catalyst.

Suitable catalysts are for example acidic salts, alkyl sulphuric acids or boric acid, or substances such as phosphoric acid esters (e. g. tributyl phosphate). The use of strong mineral acids is, however, to be avoided since they tend to polymerise the styrene. It is also advantageous to have present in the mixture undergoing distillation a polymerisation inhibitor, for example pyrogallol. The distilling operation causing the decomposition of the ether may consist in heating the mixture to a temperature of 150° C. or higher and continuously removing the resultant vapours of the produced monomeric styrene and the produced alcohol. Finally the produced alcohol and the produced monomeric styrene are separated from one another, thus giving the desired monomeric styrene of high purity.

By heating the ethyl ether of phenylmethylcarbinol with 2% of butyl hydrogen sulphate in a distillation apparatus at 120 mm. pressure, a mixture of ethanol and styrene was obtained, the recovery of ethanol being practically theoretical while that of the styrene was lower on account of some polymerisation.

Even better results are obtained by vapour-phase decomposition in the presence of certain solid catalysts. Whereas the ethers of phenylmethylcarbinol are relatively stable in the vapour phase in the absence of catalysts at temperatures as high as 500-550° C., they undergo appreciable decomposition into styrene and the corresponding alcohol at much lower temperatures in the presence of solid contact substances such as pumice stone, kieselguhr, aluminium silicate and similar substances which do not exert any pronounced polymerising action on styrene in vapour form. Thus, the passage of a vapourised mixture of 80 g./hr. of the n-butyl ether of methylphenylcarbinol and 20 litres/hr. of nitrogen over 130 cc. of pumice granules (4-8 mesh) at 250° C. resulted in a 50% decomposition of the ether into n-butanol and styrene, the latter being obtained with an efficiency of 81% based on the ether consumed.

What we claim is:

1. A process for the preparation of the ethyl ether of phenylmethylcarbinol which comprises treating styrene with ethanol in the presence of an amount of concentrated sulphuric acid of 0.5 to 5% by weight of said ethanol at a temperature of between about 50° C. and about 150° C., cooling the reaction mixture, adding sufficient triethanolamine to neutralise said sulphuric acid and distilling the reactants to separate out the said ether.

2. A process according to claim 1 wherein a polymerisation inhibitor is added to the reactants to prevent polymerisation of the said styrene.

3. A process according to claim 1 wherein a polymerisation inhibitor comprising pyrogallol is added to the reactants.

4. A process for the preparation of ethers of phenylmethylcarbinol and its homologues which comprises condensing an aryl-substituted mono-olefine of the class consisting of styrene and alkyl substitution products thereof with an alcohol having a boiling point appreciably different from that of the mono-olefine in the presence of an acidic condensation catalyst selected from the group consisting of sulphuric acid, perchloric acid and chloracetic acid and in the presence of a polymerisation inhibitor.

5. A process according to claim 4 wherein the polymerisation inhibitor is pyrogallol.

6. A process according to claim 4 wherein triethanolamine is used for neutralising said catalyst.

HERBERT MUGGLETON STANLEY.
GREGOIRE MINKOFF.
JAMES ERNEST YOUELL.